Patented Nov. 1, 1949

2,486,648

UNITED STATES PATENT OFFICE 2,486,648

PRODUCTION OF DIAMINES

Vernon E. Haury, El Cerrito, Calif., assignor to Shell Development Company, San Francisco, Calif., a corporation of Delaware No Drawing. Application March 24, 1947,
Serial No. 736,610

14 Claims. (Cl. 260—585)

This invention relates to the production of diamines, and more particularly to the production of diamines by the catalytic reaction of pyrimidine, or a derivative thereof, with hydrogen and ammonia or an amine.

Several methods for the preparation of amines, including diamines in some instances, have been described. For example, the hydrogenation of aqueous or alcoholic solutions of carbonyl compounds in the presence of ammonia, the vapor phase catalytic hydrogenation of carbonyl compounds in the presence of ammonia, and other methods such as the reduction of nitriles, have been stated to produce amines. These processes, however, are generally of limited scope and usually produce only monoamines, the cost of the reactants is high, and a chief disadvantage is the difficult and expensive methods necessary for the recovery of the desired amine.

I have now discovered a simple and economical process for the production of certain diamines by the catalytic reaction of pyrimidine, or a derivative thereof, with hydrogen and ammonia or an amine. By operation in accordance with the process of my invention, fully described hereinafter, diamines of high purity are produced quickly, economically, and in excellent yields.

The reactants employed in executing the process of the invention, a pyrimidine, ammonia, amines and hydrogen, may be obtained from any convenient source. By the term "pyrimidine" is meant pyrimidine itself, or a derivative thereof, the essential structure being:

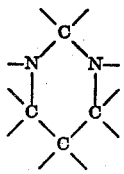

The loose valence bonds may be attached to hydrogen atoms, alkyl radicals, such as the methyl, ethyl, n-propyl, isopropyl, the butyl, and the amyl radicals; aralkyl radicals such as the benzyl, methyl benzyl, phenyl ethyl, phenyl propyl, and naphthyl methyl radicals; alkaryl radicals such as the methyl phenyl, ethyl phenyl, propyl phenyl, methyl naphthyl, and ethyl naphthyl radicals; aryl radicals such as the phenyl and naphthyl radicals; cycloparaffinic or cycloaliphatic hydrocarbon radicals such as cyclopentyl, methyl cyclopentyl, dimethyl cyclopentyl, ethyl cyclopentyl, cyclohexyl, methyl cyclohexyl, polymethyl cyclohexyl, and propyl cyclohexyl radicals. These radicals may contain substitutents, such as the hydroxyl, nitro, amino, keto, ester, etc., groups, or halogen atoms. The hydroxymethyl, hydroxethyl, hydroxypropyl, hydroxybutyl, hydroxyphenyl, hydroxynaphthyl, hydroxycyclopentyl, hydroxycyclohexyl, nitromethyl, nitroethyl, nitrophenyl, methylamino, ethylamino, phenylamino, propiolyl, butyryl, acetoxy, benzoxy, chloromethyl, chloroethyl and bromophenyl radicals illustrate suitable substituted substituents. It is possible, of course, that the substituted groups may undergo reaction under the conditions of the process, e. g., a nitro group may react to form an amino group. There may be nitrogen to carbon or carbon to carbon unsaturation in the ring, as exemplified by pyrimidine itself, which has two nitrogen to carbon and one carbon to carbon unsaturated linkages in the ring. As stated above, the reactants may be obtained from any convenient source. 2,2,4,4,6-Pentamethyltetrahydropyrimidine, a preferred reactant, may be prepared by reacting acetone and ammonia according to the following equation:

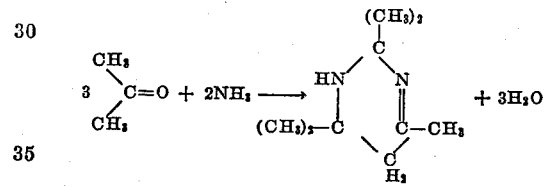

Strong mineral acids, zinc chloride, ferric chloride, ammonium chloride, ammonium nitrate, etc., are effective as catalysts for this reaction. After sufficient time for the reaction has been allowed, the desired 2,2,4,4,6-pentamethyltetrahydropyrimidine may be separated in good yields, usually substantially above 90%, from the reaction mixture by distillation, the distillate collected between about 168° C. to 171° C. at atmospheric pressure giving excellent results in the process of the present invention. Other methods for preparing pyrimidines suitable for use in the present invention may be employed, the actual method employed depending upon the reactant desired. Thus, for example, pyrimidine itself may be prepared by reacting barbituric acid with phosphorous oxychloride, and subjecting the resulting chlorinated derivative to the action of zinc dust and water. Of the other reactants, ammonia and hydrogen, may be obtained from any convenient source, and may advantageously be the commercial products commonly stored under pressure in cylinders, while the amines may be obtained by any convenient means.

Various hydrogenation catalysts may be used in the present invention. In general any suitable hydrogenation catalyst may be employed. The metal and free metal-containing hydrogenation catalysts are generally preferred. For example, Raney nickel, other metallic nickel catalysts, copper-chromite, Raney cobalt, various forms of platinum, pyrophoric iron, and copper-chromium oxide may advantageously be employed. Metallic nickel in finely divided form, such as Raney nickel, is the preferred catalyst because of the excellent results obtained therewith.

The process of the present invention may be represented by the following general equation:

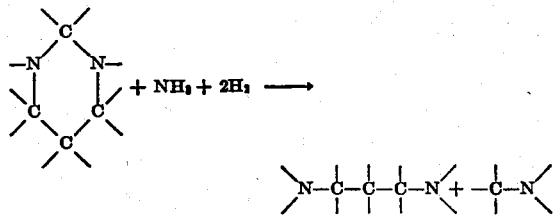

It is thus seen that diamines obtained by execution of the present invention have a structure wherein the two amine groups are separated by three carbon atoms. As a specific example, the reaction of 2,2,4,4,6-pentamethyltetrahydropyrimidine with hydrogen and ammonia may be represented by the following equation:

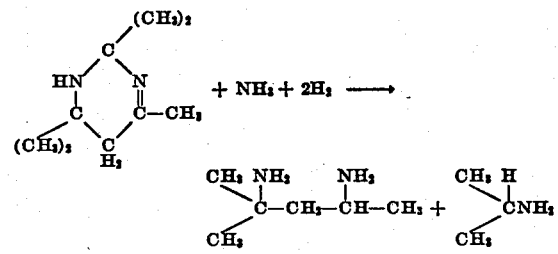

In carrying out the process of the present invention, the pyrimidine, ammonia or amine, and catalyst may be introduced into a vessel designed to withstand the pressures employed, containing means for heating and preferably fitted with stirring means. Good results are obtained when the value of the mol ratio of ammonia or amine to the pyrimidine is from about 1 to 10, though smaller or larger ratios may be used. However, the desirability of recovering unreacted reactants usually limits the ratio to within the recited limits. A mol ratio of substantially 1 gives excellent results, and from 1 to 5 mols of ammonia or amine per mol of pyrimidine is the preferred range. Hydrogen may then be added, thereby raising the pressure to the desired value, the apparatus being designed so that an excess of hydrogen at the desired pressure will be present, and the reaction vessel is then heated at least to reaction temperature. Excellent results are achieved when the operation is planned so that the pressure will be about 1000 pounds per square inch when the temperature is from about 140 to 180° C., which are the preferred operating conditions, but in many instances good results are obtained when the pressure is from about 500 to 1500 pounds per square inch at temperatures of from 100 to 300° C. As the reaction proceeds, the pressure tends to decrease as the hydrogen is absorbed and reacted. I have found it desirable to add hydrogen, continuously or intermittently, in order to maintain the pressure at the desired value. The reactants may be added in any order or combination, and the desired pressure achieved by various modifications in the above described process, while other modifications will be apparent to those skilled in the art. For example, the process of the present invention may be adapted to batch, intermittent, or continuous operation.

As illustrative of a preferred embodiment of the present invention, 2,2,4,4,6-pentamethyltetrahydropyrimidine and ammonia, in a molecular ratio of ammonia to the pyrimidine of from about 1 to 5, and a hydrogenation catalyst, such as finely divided (Raney) nickel, are introduced into a reaction vessel designed for steam heating and fitted with stirring means. Hydrogen is then added to raise the pressure to about 500 pounds per square inch, and heat is applied to the reaction vessel. Heating is continued for about 1 to 2 hours with stirring while maintaining the temperature at from about 150 to 170° C. The pressure under these conditions is about 1000 pounds per square inch, and is maintained approximately constant by occasional addition of hydrogen. On completion of the reaction, as evidenced by cessation or substantial decrease in hydrogen absorption, diacetone diamine (2,4-diamino-2-methylpentane), the desired product, may be recovered by any convenient means. For example, water may be added to the reaction mixture followed by distillation. The water forms an azeotrope with any tetramethyl-piperidine which may have formed, and which is thereby removed by the distillation operation. Ammonia, isopropylamine, and any acetone, isopropyl alcohol, or other material which may be present, are easily removed by the distillation. These by-products are in themselves valuable, and may be recovered from the distillation process by methods known to the art, and may be used as such or further treated to produce other valuable materials.

The above-described process results in surprisingly high yields of diacetone diamine of excellent quality, and affords a simple and economically feasible process for the commercial production thereof.

In a substantially identical manner, other pyrimidines may be processed to produce the corresponding diamines. Pyrimidines suitable for use in the process of the present invention include: pyrimidine, 2-methylpyrimidine, 2,5-dimethylpyrimidine, 2,2-dimethyl-1,2-dihydropyrimidine, 2,2,4-trimethyl-1,2-dihydropyrimidine, 2,2,4,4-tetramethyltetrahydropyrimidine, 2,2,4,4,6-pentamethyltetrahydropyrimidine, 2,2,4,4,6-pentamethylhexahydropyrimidine, 2,2,4,4,5,6-hexamethyltetrahydropyrimidine, 1,2,3,4,5,6-hexamethylhexahydropyrimidine, 1,1,2,3,3,4,4,5,5,6-decamethylhexahydropyrimidine, 2-ethylpyrimidine, 2,5-diethylpyrimidine, 2-methyl-5-ethylpyrimidine, 2,2-diethyl-1,2-dihydropyrimidine, 2,2,4-triethyl-1,-2-dihydropyrimidine, 2,2,4,4,6-pentaethyltetrahydropyrimidine, 2,4,-diethyl-2,4,6-trimethyltetrahydropyrimidine, 2-propylpyrimidine, 2-isopropylpyrimidine, etc., and their homologues, analogues, and suitable substitution products.

An important application of the present invention is the employment of mixtures of pyrimidines as reactants in the process of the present invention whereby a mixture of diamine products is obtained. For example, it may be undesirable or impractical to separate two or more pyrimidines, whereas the diamines produced according to the process of my invention may be easily separated, or the mixture of diamines may be valuable and have important applications without the necessity of separating the individual diamines.

As hereinbefore described, either ammonia or amines may be employed in the process of my invention for reaction with a pyrimide and hydrogen. Ammonia is the preferred reactant because of its ready availability and the excellent results achieved therewith. However, excellent results are also achieved with amines, and especially primary amines. Thus for example, methylamine, ethylamine, propylamine, isopropylamine, butylamine, etc., give excellent results. Other amines may advantageously be used in some instances: methylethylamine, diethylamine, dimethylamine, trimethylamine, triethylamine, methylpropylamine, ethylpropylamine, methylisopropylamine, dipropylamine, phenylamine and phenylmethylamine are illustrative.

The diamines prepared according to the process of the present invention have many uses. For example, they are useful in compounding surface-active agents, in the preparation of resinous materials, as vulcanization accelerators, as acid gas absorbents, in the preparation of certain pharmaceuticals, etc.

As hereinbefore stated, various modifications in the process of my invention will be apparent to those skilled in the art, and such modifications are within the scope of my invention. An important modification of the present invention is the production of diamines by the catalytic vapor phase reaction between a pyrimidine, hydrogen, and ammonia or an amine. Thus, for example, measured quantities of a vaporized pyrimidine, ammonia and hydrogen, in molecular ratios comparable to the limits hereinbefore described, may be contacted with a hydrogenation catalyst under temperature and pressure conditions suitable to affect reaction, and the desired diamine product recovered from the effluent gases.

The following examples serve to illustrate preferred embodiments of my invention, which is not to be considered as limited thereby except as defined in the appended claims:

Examples I to IV

Finely divided metallic (Raney) nickel and the indicated quantities of 2,2,4,4,6-pentamethyltetrahydropyrimidine and ammonia were introduced into a two-liter autoclave fitted with means for heating with steam and stirring. Hydrogen was added to raise the pressure to about 500 pounds per square inch at room temperature, and the charged autoclave was then rapidly heated. Hydrogenation was appreciable at from about 140 to 150° C. The heating was continued for the indicated periods of time at the indicated temperatures, the pressure in each case being increased to about 1000 pounds per square inch by the increase in temperature. After completion of the reaction, the reaction mixture was withdrawn, diluted with 250 grams of water, and subjected to distillation, thereby separating the diacetone diamine.

The following table gives the reactants, reaction conditions, and products recovered:

| Reactants (mols) | Example 1 | Example 2 | Example 3 | Example 4 |
|---|---|---|---|---|
| 2,2,4,4,6-pentamethyltetrahydropyrimidine | 5.60 | 5.62 | 5.24 | 4.76 |
| Ammonia | 6.0 | 6.6 | 8.7 | 10.0 |
| Mol ratio ammonia to the pyrimidine | 1.07 | 1.17 | 1.66 | 2.1 |

| | Example 1 | Example 2 | Example 3 | Example 4 |
|---|---|---|---|---|
| *Reaction Conditions* | | | | |
| Temperature, (°C.) | 150–170 | 150–170 | 150–175 | 150–175 |
| Pressure (pounds/in.²) | 1,000 | 1,000 | 1,000 | 1,000 |
| Time (hours) | 2 | 1.75 | 1.5 | 2 |
| *Products* | | | | |
| Isopropylamine (mols) | 3.9 | 3.6 | 3.6 | 2.9 |
| Diacetone diamine (mols) | 4.33 | 4.37 | 4.13 | 3.75 |
| Other | 1.91 | 1.47 | 1.36 | 1.01 |
| Yield of Diacetone diamine (per cent, based on the pyrimidine) | 77.5 | 78.0 | 79.0 | 78.8 |

Example V

A mixture of 2,4,5,6-tetramethyl-2,4-diethyltetrahydropyrimidine and 2,4-dimethyl-2,4,6-triethyltetrahydropyrimidine was prepared by condensing methyl ethyl ketone and ammonia. 2.56 mols (500 parts) of this mixture, 3.53 mols (60 parts) of ammonia, and about 5% by weight of finely divided metallic (Raney) nickel were introduced into an autoclave and hydrogen added as described in Example I–IV. The autoclave was heated for 4 hours at a temperature of from 150 to 180° C., the pressure being from 1000–1200 pounds/in.² 147 parts of a mixture of 3,4-dimethyl-3,5-diaminohexane and 3-methyl-3,5-diaminoheptane was obtained.

Example VI 770 parts of 2,2,4,4,6-pentamethyltetrahydropyrimidine, 295 parts of isopropylamine, and about 40 parts of finely divided metallic (Raney) nickel catalyst were introduced into an autoclave. Hydrogen was added and the reactants heated to a temperature of from 150 to 170° C. for 2 hours, the pressure being maintained between 500 and 600 pounds/in.² by hydrogen addition. Diacetone diamine was recovered and purified by distillation, 180 parts of the purified material being obtained. Diisopropylamine was collected as a valuable by-product.

The invention claimed is

1. A process for producing diamines which comprises reacting a pyrimidine with hydrogen and a material selected from the group consisting of ammonia and a primary amine, in the presence of a hydrogenation catalyst.

2. A process for preparing diamines which comprises reacting a pyrimidine with hydrogen and ammonia in the presence of a hydrogenation catalyst at a pressure of from 500 to 1500 pounds per square inch.

3. A process for preparing diamines which comprises reacting a pyrimidine with hydrogen and ammonia in the presence of a hydrogenation catalyst at a pressure of from 500 to 1500 pounds per square inch and at a temperature of from 100° C. to 300° C.

4. The process for the preparation of diamines which comprises reacting a mixture of a pyrimidine and ammonia containing 1 mol of the pyrimidine to from 1 to 10 mols of ammonia with hydrogen at a pressure of from 500 to 1000 pounds per square inch and a temperature of from 100 to 300° C. in the presence of a nickel catalyst.

5. A process for the preparation of diamines which comprises subjecting a mixture of a pyrimidine, ammonia and hydrogen to a pressure of above 500 pounds per square inch at a temperature above 100° C. in the presence of a hydrogenation catalyst.

6. A process for preparing diamines which comprises reacting a pyrimidine with hydrogen and a primary amine in the presence of a hydrogenation catalyst.

7. A process for producing diacetone diamine which comprises reacting 2,2,4,4,6-pentamethyltetrahydropyrimidine with hydrogen and isopropylamine in the presence of a hydrogenation catalyst.

8. A process for producing diacetone diamine which comprises reacting 2,2,4,4,6-pentamethyltetrahydropyrimidine with hydrogen and ammonia in the presence of a hydrogenation catalyst.

9. A process for preparing diacetone diamine which comprises reacting 2,2,4,4,6-pentamethyltetrahydropyrimidine with hydrogen and ammonia in the presence of a hydrogenation catalyst at pressure of from 500 to 1000 pounds per square inch.

10. A process for preparing diacetone diamine which comprises reacting 2,2,4,4,6-pentamethyltetrahydropyrimidine with hydrogen and ammonia in the presence of a hydrogenation catalyst at a pressure of from 500 to 1500 pounds per square inch and at a temperature of from 100 to 300° C.

11. The process for the preparation of diacetone diamine which comprises reacting a mixture composed of 1 mol of 2,2,4,4,6-pentamethyltetrahydropyrimidine and from 1 to 10 mols of ammonia with hydrogen at a pressure of from 500 to 1000 pounds per square inch and a temperature of from 100 to 300° C. in the presence of a nickel catalyst.

12. A process for the preparation of diacetone diamine which comprises reacting a mixture of 2,2,4,4,6-pentamethyltetrahydropyrimidine, ammonia and hydrogen at a pressure of from 500 to 1000 pounds per square inch and at a temperature of from 100 to 300° C. in the presence of a metallic nickel catalyst, and separating diacetone diamine from the resulting products.

13. A process for the production of 3,4-dimethyl-3,5-diaminohexane which comprises reacting 2,4,5,6 - tetramethyl-2,4-diethyltetrahydropyrimidine with hydrogen and isopropylamine in the presence of a hydrogenation catalyst.

14. A process for the production of 3-methyl-3,5-diaminoheptane which comprises reacting 2,4-dimethyl-2,4,6-triethyltetrahydropyrimidine with hydrogen and isopropylamine in the presence of a hydrogenation catalyst.

VERNON E. HAURY.

REFERENCES CITED

The following references are of record in the file of this patent:

UNITED STATES PATENTS

| Number | Name | Date |
|---|---|---|
| 2,318,729 | Wilson | May 11, 1943 |
| 2,318,730 | Wilson | May 11, 1943 |

FOREIGN PATENTS

| Number | Country | Date |
|---|---|---|
| 365,214 | Great Britain | Jan. 21, 1932 |